United States Patent Office 3,250,526
Patented May 10, 1966

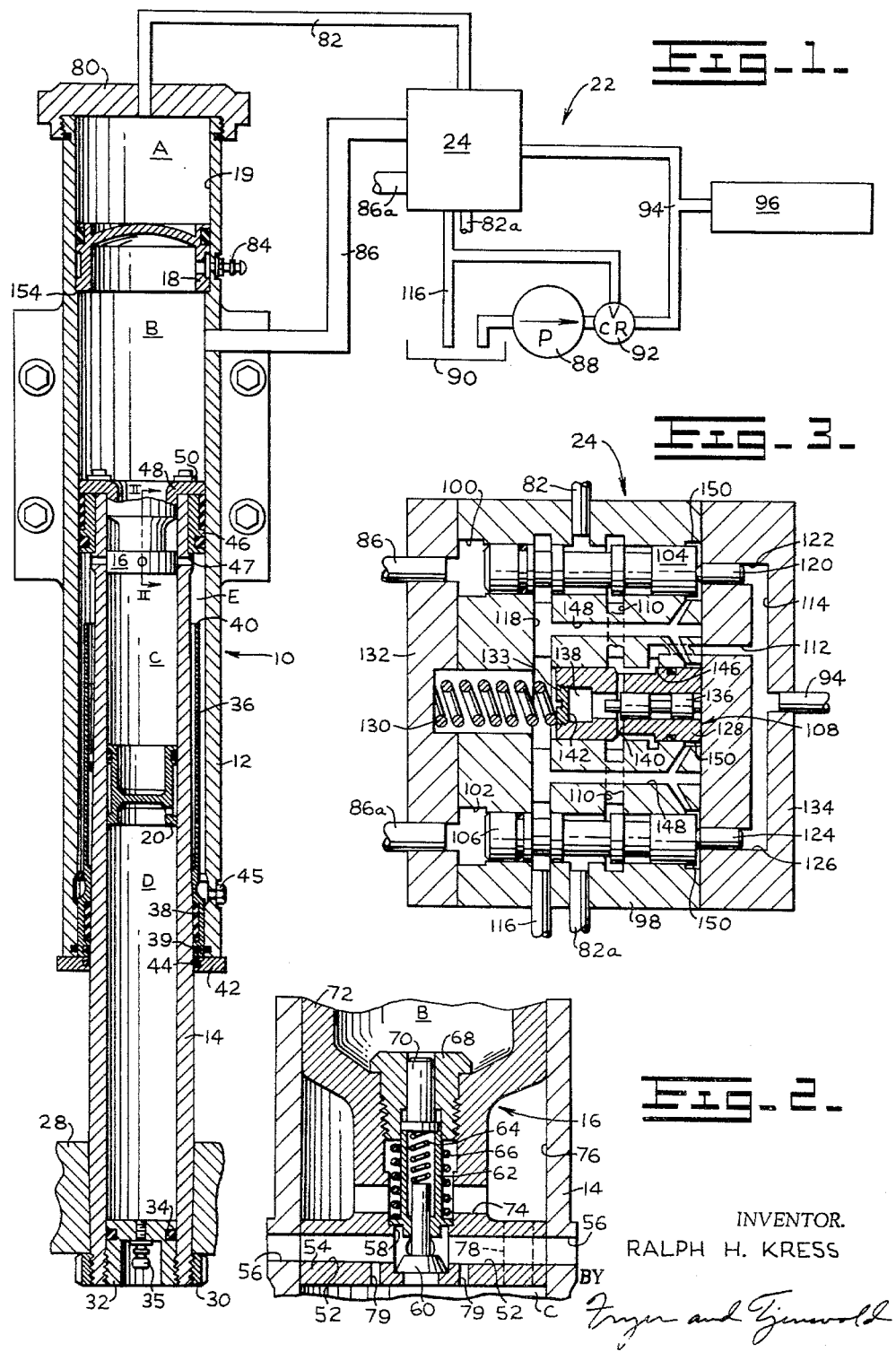

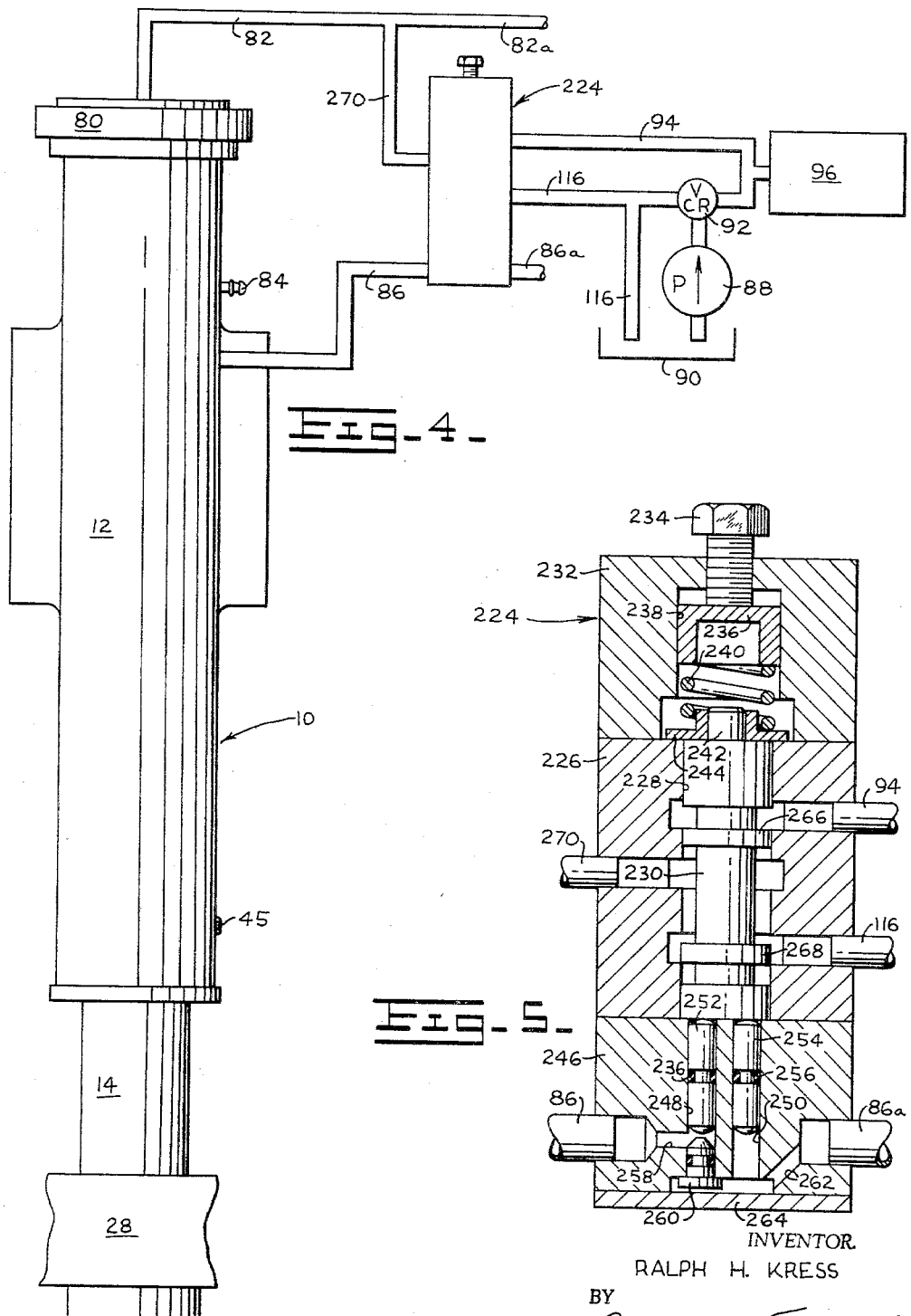

3,250,526
VEHICLE SUSPENSION DEVICE
Ralph H. Kress, Peoria, Ill., assignor to Caterpillar Tractor Co., Peoria, Ill., a corporation of California
Filed Dec. 14, 1964, Ser. No. 418,192
11 Claims. (Cl. 267—64)

This invention relates to a vehicle suspension device and more particularly to a device which is capable of providing resilient support and adequate ground clearance for the vehicle under varying conditions of static and dynamic loading.

Efforts in improving vehicle suspensions have for their object a suspension system which yields ideal riding characteristics under various road and loading conditions and yet support the vehicle at an adequate distance above the ground level. Conventional suspension systems incorporating springs and shock absorbers provide certain riding characteristics when the vehicle is unloaded and other riding characteristics under conditions of maximum load. If the suspension system is designed to give maximum operator comfort under conditions of maximum load, the ride achieved during non-loaded conditions is very stiff and bouncy and accordingly results in very poor operator comfort.

In overcoming these drawbacks of the spring-shock absorber systems, vehicle suspension devices incorporating a confined body of elastic fluid have been proposed. Some of them have been reasonably successful in maintaining substantially constant riding characteristics from a no-load to a full-load condition. Such suspension systems, however, are incapable of maintaining adequate ground clearance when the vehicle is loaded.

It is a feature of this invention to provide a vehicle supporting device which includes the concept of providing confined bodies of fluid, but in addition it is operative to maintain the vehicle body a desired distance above a ground level and yet maintain the same riding characteristics during condition of load and no-load. Fulfillment of this feature is accomplished by providing an external source of hydraulic liquid under pressure which is communicated to the suspension device in response to the pressure of a confined body of elastic fluid in the suspension device.

One embodiment of this invention discloses a control valve operative to an increase in pressure of the elastic fluid for communicating a source of high pressure liquid fluid to the device in order to cause extension of the device and thus elevate the vehicle body. More particularly the control valve of this embodiment includes a pair of spools each one of which is controlled by the suspension device in order to admit pressurized hydraulic liquid from an external source to the device.

Another embodiment of this invention discloses a control valve having a single spool which operates to admit pressurized hydraulic liquid from the external source to at least a pair of suspension devices in response to the sum of the pressures of the suspension devices.

Accordingly, it is an object of this invention to provide a new and improved vehicle supporting device.

Another object of this invention is to provide a liquid-gaseous suspension device from which is derived an output pressure signal for controlling the admission and discharge of supplementary pressure fluid to the strut in order to provide resilient support over the vehicle load range.

Another object of this invention is to provide a telescopingly arranged vehicle supporting strut which increases its resistance to being retracted as the weight supported by the vehicle increases.

The nature of the invention and the advantages thereof will be clear to those skilled in the art from the following detailed description of the preferred embodiment of the invention and the accompanying drawings in which:

FIG. 1 shows the novel vehicle suspension device of this invention in longitudinal section with an external hydraulic circuit shown diagrammatically.

FIG. 2 is an enlarged section taken substantially along the line II—II of FIG. 1.

FIG. 3 is a section of the load compensating valve shown diagrammatically in FIG. 1.

FIG. 4 is a diagrammatic view of a modification incorporating the principles of this invention wherein a modified control valve operating to admit pressurized hydraulic fluid to the struts in response to the sum of the pressures of the struts associated therewith.

FIG. 5 is an enlarged longitudinal section of the control valve shown in FIG. 4.

Referring to FIG. 1 the illustrated suspension device embodying the present invention comprises several interrelated major components, namely a liquid-gaseous strut 10 formed by telescopingly arranged elongated tubular members 12 and 14, respectively, the outer and inner member. A valve mechanism 16 is mounted on the end of member 14, disposed in the member 12 and assists in controlling the rate at which the members 12 and 14 move relative to each other. The valve 16 defines a partition separating the interior of the tubular member 12. A free piston 18 is reciprocably mounted in a counterbored portion 19 at the upper end of the member 12 and defines two chambers denoted by the letters A and B. Another free piston 20 is reciprocably mounted in the bore of the inner member 14 and defines chambers denoted by the letters C and D. The strut 10 is associated with a hydraulic circuit 22, including valve means 24, which is operative to supply liquid pressure fluid to the chamber A in response to the weight supported by the strut. The pressure fluid which is supplied by the hydraulic circuit 22 fulfills the object of varying the effective length of the strut but does not interfere with the dynamic characteristics of the strut.

The tubular member 14 has its outwardly extending end connected to a wheel bracket 28 by a nut 30. A threaded plug 32, which includes a seal 34, is threaded into the end of the member 14 and serves to close the member 14. The chamber D is filled with gaseous fluid at a predetermined pressure with such fluid being admitted to the chamber by a valve 35 mounted in a plug 32.

The members 12 and 14 provide an annular chamber indicated by the letter E within which is located a tubular sleeve 36 which contains a bearing sleeve 38 and a seal 39 to establish a fluid tight seal. It is to be noted that the tubular sleeve 36 extending upwardly an appreciable distance in the annular chamber E and its end surface 40 serves as a stop for the member 14 in the event of excessive rebound. The lower end of the tubular member 12 has an annular ring 42 which includes a wiper seal member 44 fixed thereon and constitutes a closure for the annular chamber E.

The chambers C and E are filled with a suitable liquid which is admitted through a valve 45 mounted in the wall of the member 12. In filling the chambers C, D and E a predetermined value of pressure is maintained in the respective chambers with such pressure being dictated by the weight to be supported by the strut. It can readily be seen that the position of the free piston 20 will be determined by the quantity of fluid in the chambers C and D. The piston 20 will assume a position wherein the forces acting on its opposite sides are equal.

The upper end of the inner member 14 has a retaining ring 46 slidably mounted thereon and held against longitudinal movement by being seated against a shoulder 47 and a flange 48 which is part of the valve 16. A plurality of bolts 50 extending through the flange 48 secure the valve to the member 14.

The valve mechanism 16, shown in enlarged section in FIG. 2, operates to control the rate of movement between the outer member 12 and the inner member 14 by regulating the flow of fluid between the chamber C and the chamber E. This valve is commonly referred to as a load sensitive rebound damping and check valve mechanism operating in a manner hereinafter described to throttle the flow of fluid between the chambers C and E.

As shown in the enlarged section of FIG. 2, the valve mechanism 16 comprises a plurality of circumferentially spaced radially extending communicating passageways 52 formed in a lower wall 54 that is closely fitted in the bore of the inner member 14. A plurality of holes 56 are formed through the wall of the inner member 14 and communicate with the passageways 52 so that a continuous passageway is provided for permitting the flow of fluid between the chambers C and E. The inner ends of the passageways 52 open to a stepped axial bore 58 within which are operatively disposed check valves 60 and 62 being associated with springs 64 and 66, respectively, which are effective to bias the valves against the shouldered portions of the bore 58. The upper end of the bore 58 has a bushing 68 threadedly mounted therein and within which is disposed a plunger 70 having its lower end in engagement with the check valve 62 and the spring 64. The upper end of the plunger 70 is exposed to the chamber B so that the pressure in this chamber is effective to bias the plunger 70 downwardly assisting in urging the check valve 62 in its seated position and also being effective to compress the spring 64 urging the check valve 60 in its seated position.

The body of the valve 16 is formed with a portion of reduced diameter 72 through which a plurality of radially extending passageways 74 are formed communicating with the bore 58 and with an annular cavity 76. Communication between the annular cavity 76 and the chamber C is provided by a passageway 78 (shown in dotted outline) formed through the wall 54.

In describing the operation of the valve 16, let it be assumed that the vehicle is moving and the wheel associated with the illustrated strut strikes a bump which effects upward movement of the inner member 14 relative to the outer member 12. It is to be kept in mind that the fluid in the chambers C and E are substantially incompressible. The instantaneous movement of the inner member 14 upwardly increases the volume of the annular chamber E and accordingly causes the pressure in this chamber to drop. The pressure in chamber C is then at a higher value, consequently, the check valve 60, which is exposed to the chamber C, experiences a pressure difference since the drop in pressure in the annular chamber E also drops the pressure in the communicating passageways 52 and 56 which are open to the annular chamber E. The check valve 60, therefore, is moved upwardly against the bias of the spring 64 allowing the fluid in the chamber C to flow into the passageways 52 to the annular chamber E. Such flow continues until the pressures in the chambers C and E are of substantially the same value.

As the wheel comes off of the bump, the strut tends to elongate by outward movement of the inner member 14 relative to the outer member 12. Under these conditions an instantaneous rise in pressure occurs in the annular chamber E and in the passageways 56 and 52 holding the check valve 60 against its seat and causing the check valve 62 to be biased upwardly against the force of the plunger 70 and the spring 66 allowing fluid to flow through the passageway 74, to the annular chamber 76, and through the passageways 78 to the chamber C. Such flow occurs, of course, until the pressure in the chambers C and E are substantially equal.

The above described operation of the check valves 60 and 62 occurs when the amplitude of reciprocation between the members 12 and 14 is rather large thus giving rise to higher pressures which are of sufficient value to cause opening and closing of these valves. Where relatively smooth road conditions are encountered, hence giving rise to lower values of pressure which are insufficient to cause operation of the valves 60 and 62, this invention provides orifices which permit flow of fluid between the chambers C and E. Such orifices are designed to permit a desired rate of flow between these chambers in order to attenuate the reciprocation between the members 12 and 14. As shown in FIG. 2 each passageway 52 is in communication with small passageways 79 extending through the wall 54. These small passageways are spaced radially outwardly relative to the valves 60 and 62 and established fluid communication between the chambers C and E by a path which by-passes the valves 60 and 62. In this manner fluid flow between the chambers C and E is throttled as it traverses the passageways 79, thus damping the motion of the member 14 relative to the member 12.

In accordance with the basic object of maintaining a desired ground clearance for the vehicle, the chamber B is connected to valve 24, which forms part of the hydraulic circuit 22, in order to control the admission and exhaust of liquid pressure fluid to the chamber A in response to the pressure in chamber B. As shown in FIG. 1, a cap 80 is threaded to the upper end of the member 12 and defines the upper wall of the chamber A. Liquid pressure fluid from the valve 24 is communicated to the chamber A by a conduit 82 and a conduit 86 communicates the gaseous fluid in chamber B to the valve 24. Gaseous fluid for charging the chamber B is admitted from an external source of supply through a valve 84 mounted in the wall of the outer member 12. The value of pressure maintained in chamber B depends upon several factors certain of which are the design load of the vehicle, the diameter of the strut and the amount of ground clearance one desires to maintain. The gaseous fluid, in the chamber B communicated to the valve 24, is employed as a source of pilot pressure to effect shifting of spools in the valve 24 in order to cause flow of liquid pressure fluid to the chamber A which is effective to control retraction of the strut.

The hydraulic circuit 22 comprises a suitable pump 88 arranged in a conventional manner with a tank 90 and a relief valve 92. Pressure fluid from the pump 88 is supplied to an accumulator 96 and to the valve 24 by a conduit 94.

Referring now to FIG. 3, which shows an enlarged section of the valve 24, it is seen that this valve comprises a body 98 having bores 100 and 102 within which are slidably mounted spools 104 and 106, respectively. The valve 24 is provided with a pressure reducing valve assembly 108 which is operable to reduce the value of pressure of the fluid derived from the accumulator 96 before it is communicated to the chamber A. The valve body 98 is provided with an internal passageway 110 communicating with the bores 100 and 102 and with the conduit 94 by passageways 112 and 114. Pressure fluid from the chamber A is returned to the tank 90 by a conduit 116 which is in communication with a passageway 118 communicating with the bores 100, 102 and with the bore within which the valve assembly 108 is mounted.

Limited reciprocation of the spools 100 and 102 in their bores is provided for by making the bores slightly longer in length than the spools. In the position illustrated the spool 104 establishes communication between the passageway 110 and the conduit 82 thus permitting liquid pressure fluid from the accumulator 96 to be communicated to the chamber A. Reciprocation of the spools is effected by the force derived from the pressure of the gaseous fluid in the chamber B communicated to the bore 100 by the conduit 86 causing the spool to be shifted to the right (as viewed in FIG. 3), and by a small piston 120 reciprocably mounted in a branch passageway 122 which defines a continuation of the passageway 114. In this manner hydraulic fluid communicated to the passageway 114 by the conduit 94 biases the piston 120 in forceable engagement with the end of the spool 104 and is effective to shift the spool 104 to the left when the pressure in the chamber B is reduced.

The spool 106 operates in the identical manner as spool 104 since it is operable by means of conduits 86a and 82a to supply and exhaust pressure fluid from another strut (not shown) in the same manner described in connection with the spool 104. It will be noted that the spool 106 is urged to the left by a small piston 124 reciprocably mounted in a branch conduit 126 which is supplied with pressure fluid by the conduit 94 and the passageway 114.

The pressure reducing valve assembly 108 comprises a spool 128 spring biased by a spring 130, located between the valve cap 132 and a plug 133 secured to the spool, which urges the spool against the valve cap 134. A small piston 136 is freely mounted in the bore of the spool 128 and is held against the valve cap 134 by the pressure fluid communicated to the chamber 138 through a plurality of radially extending passageways 140 communicating with the passageways 110 and 112. Pressure fluid communicated to the chamber 138 by the passageways 112 and 140 is effective, by acting against the surface 142, to shift the spool 128 to the left while at the same time, by acting on exposed surface of the small piston 136, holds this piston against the valve cap 134. Movement of the spool 128 to the left as described causes the pressure fluid communicated through the passageway 112 to be throttled by a land 146 formed on the other periphery of the spool 128 thereby reducing the pressure of the fluid flowing through the passageway 110 and through the conduit 82.

The valve body 98 is formed with a system of communicating passageways 148 connecting relieved portions 150 associated with each of the spools 104 and 106 and with the reducing valve assembly 108 for exhausting any seepage of fluid back to the tank.

In describing the operation of this invention, it will first be assumed that the vehicle is empty. Under these circumstances the free piston 18 is located against the cap 80 thereby reducing the volume of chamber A to a minimum. Under these conditions, the pressure of the gaseous fluid in chamber B is insufficient to cause the spools 104 and 106 to be shifted to the right, therefore blocking communication of the accumulator 96 with the chamber A.

As the vehicle is loaded, the body and the outer tubular member 12 which is attached to the body moves downwardly relative to the inner member 14 reducing the volume and increasing the pressure of the chamber B to a value sufficient to cause the force of such pressure communicated to the bore 100 by the conduit 86 to overcome the biasing force of the piston 120 thereby shifting the spool 104 to the right and establishing communication between the passageway 110 and the conduit 82. With the spool 104 thus shifted pressure fluid derived from the accumulator 96 flows through the conduit 94, through the passageway 114, and through the passageway 112 which communicates with the passageway 110 and accordingly pressure fluid is admitted to the chamber A moving the free piston 18 downwardly further increasing the pressure of the gaseous fluid in chamber B which is effective to extend the inner member 14 and thus increase the effective length of the strut dependent upon the vehicle load. The maximum volume attainable by the chamber A is limited by a shoulder 154 which defines the downward limit of travel of the free piston 18. When the vehicle is loaded to its rated capacity the piston 18 assumes a position abutting the shoulder 154 so that the pressure in chamber B and C tend to equalize in order to preclude excessive elevation of the vehicle.

In contrast to the above-described separate spools 104 and 106 which are arranged to control the admission and discharge of hydraulic fluid from the accumulator 96 to individual struts, the modification shown in FIGS. 4 and 5 causes compensation of at least a pair of struts by providing a control valve with a central spool which is effective to communicate hydraulic fluid from the accumulator 96 to the struts in response to the sum of the pressures in the chambers B.

The modified system shown in FIG. 4 is essentially identical to the preferred embodiment with the exception that a control valve 224 operates to admit the hydraulic pressure fluid from the accumulator 96 to a pair of struts when the sum of the pressures communicated to the valve 224 by the conduits 86 and 86a is of a selected value. Although not shown it is to be understood that another strut identical to the strut 10 is connected to the conduits 86a and 82a. Referring now to FIG. 5, it will be seen that the control valve 224 comprises a central body section 226 having elongated through-bore 228 within which is reciprocably mounted a spool valve 230. On the upper end of the body section 226 there is mounted an end cap 232 which includes a threaded adjustment screw 234 having its lower end in contact with cup-shaped member 236, freely mounted in a bore 238, and biased upwardly against the end of the screw 234 by a spring 240. The spool 230 is formed with a reduced diameter portion 242 extending into the bore 238, and upon which is slidably fitted a flange member 244 against which the spring 240 is seated. The spring 240 applies a biasing force urging the spool 230 downwardly. The amount of bias which is imparted to the spool 230 can be regulated by merely adjusting the screw 234 toward or away from the spool to, respectively, increase or decrease such bias.

On the opposite end of the body section 226 there is mounted a body portion 246 formed with adjacent bores 248 and 250 within each of which is slidably mounted small pistons 252 and 254 being located to engage the lower end of the spool 230. Each small piston is provided with seals 256 which prevent flow of the gaseous fluid, derived from the conduits 86 and 86a, into the bore 228. Gas pressure derived from the chamber B of the strut is communicated to the bore 248 by a passageway 258 extending from the bore 248 to the conduit 86. A sealed plug 260 is fitted in the lower end of bore 248 and prevents communication of the pressure in the bore 250 from entering the bore 248. In like manner the pressure of the gas in the second strut (not shown) is communicated to the bore 250 by the conduit 86a and a passageway 262. The body portion 246 is provided with an end cap 264 suitably mounted thereto to prevent escape of pressure fluid.

Hydraulic fluid under pressure from the accumulator 96 is communicated to the valve 224 by the conduit 94 and is returned to the tank 90 by the conduit 116. In controlling the flow of such pressurized hydraulic fluid from the accumulator 96, the spool 230 is provided with an upper land 266. In a similar manner return of the hydraulic fluid to the tank 90 by the conduit 116 is controlled by a lower land 268. A conduit 270 is connected to the valve 224 and to the conduits 82 and 82a in order to direct pressurized hydraulic fluid from the accumulator 96 to the chambers A of each strut. The conduit 270, also returns fluid to the tank 90 by the conduit 116 depending on the position of the spool 230.

In describing the operation of this embodiment let it be assumed that the vehicle is being loaded with material thereby lowering the body and accordingly the member 12 which is rigidly attached to the body. This increases the pressure of the gas in the chamber B of each strut with such increases in pressure being communicated to the bores 248 and 250 increasing the upward bias the pistons 252 and 254 exert on the spool 230. At some stage during loading, the pressure achieved by the fluid in the chambers B, and the consequent force exerted by the pistons 252 and 254, is sufficient to overcome the bias of the spring 240 thereby shifting the spool 230 to establish communication between the conduits 94 and 270. The hydraulic liquid in the accumulator 96 is then free to flow into the chambers A moving the free piston 18 downwardly which causes the outer member 12 and the vehicle body to move upwardly. Accordingly the vehicle body is raised and a sufficient ground clearance results when the vehicle is loaded. After the load is dumped, the pressure in the chambers B is reduced and the force of the spring is greater than the force exerted by the small pistons 252 and 254 which causes the spool 230 to be shifted establishing communication between the conduit 270 and the drain conduit 116. The hydraulic fluid in chambers A is thus returned to the tank 90 allowing the vehicle body to be lowered and yet establishes sufficient ground clearance for the non-loaded condition.

Thus as a result of this invention, a novel vehicle supporting strut is provided which is associated with an external source of pressure fluid which is operable to increase the effective length of the strut in response to the load supported by the strut. Although the novel valve mechanism shown in FIG. 3 is shown and described to be associated with two struts, it is to be realized that the valve 24 can be constructed with as many spools as there are struts, thus in the usual case, four struts may be connected in the manner described.

I claim:

1. A hydro-pneumatic vehicle supporting device comprising a telescopingly arranged piston and cylinder defining a primary chamber of variable volume; means reciprocably mounted in said chamber dividing said primary chamber into first and second chambers; said first chamber being filled with a gaseous fluid under pressure and said second chamber being arranged to contain liquid fluid under pressure; a pressure responsive control means for establishing communication between a source of liquid fluid under pressure and said second chamber; and means for communicating the pressure fluid of said first chamber to said control means for establishing communication of said source with said second chamber.

2. A hydro-pneumatic vehicle supporting device comprising a telescopingly arranged piston and cylinder defining a primary chamber of variable volume; a free piston reciprocably mounted in said chamber dividing said primary chamber into first and second chambers; said first chamber being filled with a gaseous fluid under pressure which is effective to bias said free piston in one direction; control means in communication with said first chamber and a source of liquid pressure fluid for communicating such fluid to said second chamber in order to move said free piston in a direction opposite to said one direction in opposition to the bias of the gaseous fluid; and means in said control means, responsive to an increase in pressure in said first chamber occasioned by retraction of said piston, for establishing communication between said source of liquid pressure fluid and said second chamber.

3. In a telescoping vehicle suspension device of the type including a plurality of expansible chambers which control the rate and the extent to which said device is retracted occasioned by dynamic and static forces, the combination with a pair of said chambers of a hydraulic circuit including a source of pressure fluid and a control valve, one of said pair of chambers being connected to said control valve for conditioning said control valve to admit and discharge pressure fluid derived from such source to the other of said pair of chambers in response, respectively, to increases and decreases in the static load supported by said device.

4. In a telescoping vehicle suspension device of the type including a plurality of tandem expansible chambers which control the rate and the extent to which said device is retracted occasioned by dynamic and static forces, the combination with a pair of said chambers of a hydraulic circuit including a source of liquid pressure fluid and a control valve, one of said pair of chambers containing a pressurized gaseous fluid communicating with said control valve being operable to condition said control valve to admit and discharge pressure fluid derived from such source to the other of said pair of chambers in response, respectively, to increases and decreases in the static load supported by said device.

5. In a telescoping vehicle suspension device of the type including a plurality of pressurized tandem expansible chambers which control the rate and the extent to which said device is retracted occasioned by dynamic and static forces, the combination with a pair of said chambers of a hydraulic circuit including a source of pressure fluid and a control valve, one of said pair of chambers being connected to said control valve for conditioning said control valve to admit and discharge pressure fluid derived from such source to the other of said pair of chambers in response, respectively, to increases and decreases in the static load supported by said device, said control valve comprising a spool element rectilinearly movable in opposite directions in an elongated bore having one end in communication with the pressure fluid in said one of said chambers and the other end engageable with a piston which is biased by the fluid pressure from said source, said spool being operative to establish communication between said source and said other of said chambers when the force exerted by the pressure fluid in said one of said pair of chambers is greater than the force exerted by said piston.

6. A hydro-pneumatic vehicle supporting strut comprising a telescopingly arranged piston and cylinder defining a primary chamber of variable volume; a free piston reciprocably mounted in said chamber, dividing said primary chamber into first and second chamber; said first chamber being filled with a gaseous fluid under pressure and said second chamber being adapted to contain liquid fluid under pressure; a hydraulic circuit including a source of liquid pressure fluid and a control valve, said first and second chambers being in communication with said control valve with the pressure of the gaseous fluid in said first chamber being operative to condition said control valve to permit flow of pressure fluid from said source to said second chamber in response to increases in pressure of the fluid in said first chamber; and means responsive to decreases in pressure in said first chamber for conditioning said control valve to permit flow of fluid from said second chamber.

7. A hydro-pneumatic vehicle supporting device comprising telescopingly arranged piston and cylinder defining a primary chamber of variable volume; a free piston reciprocably mounted in said chamber for dividing said primary chamber into first and second chambers; said first chamber being filled with a gaseous fluid under pressure which is effective to bias said free piston in a direction decreasing the volume of said second chamber; a hydraulic circuit comprising a control valve and an accumulator containing liquid fluid under pressure; said control valve having a two position spool biased in one position by the gaseous fluid in said first chamber which is communicated thereto and in the second position by the pressure fluid of said accumulator; a conduit establishing communication of said second chamber with said control valve permitting flow of accumulator pressure fluid to said second chamber in response to retraction of said piston which increases the pressure in said first chamber a sufficient amount to cause shifting of said spool and thereby establish communication between said accumulator and said second chamber.

8. In combination, at least two vehicle supporting struts each of which include a chamber charged with gaseous fluid at a selected pressure, a hydraulic circuit for supplying pressurized liquid to another chamber of each strut, control valve means in said circuit for controlling the flow of pressurized liquid to and from said struts, and means in said valve means responsive to the sum of the pressure of said first mentioned chambers for conditioning said valve means to permit flow of pressurized liquid to or from said struts.

9. In combination, at least two vehicle supporting struts each of which include a chamber charged with gaseous fluid at a selected pressure, a hydraulic circuit for supplying pressurized liquid to another chamber of each strut, control valve means in said circuit for controlling the flow of pressurized liquid to and from said struts, and means in said valve means responsive to the sum of the pressure of said first mentioned chambers for conditioning said valve means to permit flow of pressurized liquid to or from said struts, said means comprising a piston in communication with each of said first mentioned chambers for effecting the conditioning of said valve means.

10. A vehicle suspension apparatus comprising a pair of hydro-pneumatic struts each of which is connected to a wheel of the vehicle, each of said struts comprising telescoping members defining a first chamber containing a gaseous fluid under pressure whose volume varies with the weight supported thereby, a second chamber in each of said struts defined by a movable boundary wall separating said first and second chambers, a source of hydraulic fluid under pressure in controlled communication with said second chamber of each strut, control valve means including a reciprocable spool spring biased in one direction for blocking communication of said second chamber with said source of hydraulic fluid and biased in the opposite direction by the sum of the pressures in said first chambers for permitting flow of hydraulic fluid to said second chambers, said control valve including a piston for each of said first chambers for moving said spool in said opposite direction and thus permitting flow of hydraulic fluid to said second chambers to thereby effect elongation of said struts.

11. A vehicle suspension apparatus comprising a pair of hydro-pneumatic struts, each of said struts comprising telescoping members defining a first chamber and a second chamber separated by a movable boundary wall, said chamber defining a volume which varies in accordance with the weight supported by said struts, a source of hydraulic fluid under pressure in controlled communication with said second chamber of each strut, and control valve means including a reciprocable spool spring biased in one direction for blocking communication of said second chamber with said source of hydraulic fluid and biased in the opposite direction by the sum of the pressures in said first chambers for permitting flow of hydraulic fluid to said second chambers.

References Cited by the Examiner
UNITED STATES PATENTS

| | | | |
|---|---|---|---|
| 820,707 | 5/1906 | Downev | 267—15 |
| 2,554,581 | 5/1951 | Levy | 267—64 X |
| 2,593,040 | 4/1952 | Lloyd | 280—104 |
| 2,977,134 | 3/1961 | Helling | 280—124 |
| 3,077,345 | 2/1963 | Anderson | 267—64 |

BENJAMIN HERSH, *Primary Examiner.*